(12) United States Patent
Aravind et al.

(10) Patent No.: US 8,976,471 B1
(45) Date of Patent: Mar. 10, 2015

(54) SYSTEMS AND METHODS FOR TWO STAGE TONE REDUCTION

(71) Applicant: LSI Corporation, San Jose, CA (US)

(72) Inventors: Nayak Ratnakar Aravind, Allentown, PA (US); Bruce A. Wilson, San Jose, CA (US); Lu Pan, San Jose, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/025,356

(22) Filed: Sep. 12, 2013

Related U.S. Application Data (60) Provisional application No. 61/874,315, filed on Sep. 5, 2013.

(51) Int. Cl.
*G11B 5/09* (2006.01)
*H04L 1/00* (2006.01)
*H04L 25/03* (2006.01)
*G11B 20/10* (2006.01)

(52) U.S. Cl.
CPC ........ *H04L 1/0014* (2013.01); *H04L 25/03878* (2013.01); *G11B 20/10046* (2013.01)
USPC ................... 360/39; 360/46; 360/55; 360/65; 360/67

(58) Field of Classification Search
None
See application file for complete search history.

(56) References Cited

U.S. PATENT DOCUMENTS

| | | | |
|---|---|---|---|
| 5,222,069 A | 6/1993 | Chevalley | |
| 5,731,922 A | 3/1998 | Yamasaki | |
| 5,938,790 A | 8/1999 | Marrow | |
| 6,029,264 A | 2/2000 | Kobayashi | |
| 6,272,659 B1 | 8/2001 | Zook | |
| 6,373,647 B1* | 4/2002 | Baker | ............................. 360/25 |
| 6,438,724 B1 | 8/2002 | Cox | |
| 6,446,234 B1 | 9/2002 | Cox | |
| 6,493,846 B1 | 12/2002 | Kondo | |
| 6,694,477 B1 | 2/2004 | Lee | |
| 6,810,094 B1 | 10/2004 | Lu | |
| 6,847,601 B2 | 1/2005 | Kanai | |
| 7,178,086 B2 | 2/2007 | Hassner | |
| 7,395,491 B2 | 7/2008 | Chen | |
| 7,685,497 B2 | 3/2010 | Kons | |
| 8,230,292 B2 | 7/2012 | Fujiwara | |
| 2005/0166132 A1 | 7/2005 | Shen et al. | |
| 2005/0286353 A1* | 12/2005 | Hanano | ...................... 369/44.13 |
| 2007/0201632 A1 | 8/2007 | Ionescu | |

(Continued)

FOREIGN PATENT DOCUMENTS

JP        06046406        2/1994

OTHER PUBLICATIONS

Kang et al., "A Two-Stage Iterative Decoding of LDPC Codes for Lowering Error Floors", IEEE Globecom Proceedings, 1088-1091 (2008).

(Continued)

*Primary Examiner* — Muhammad N Edun
(74) *Attorney, Agent, or Firm* — Hamilton DeSanctis & Cha (57) ABSTRACT

Systems and method relating generally to data processing, and more particularly to systems and methods for tone reduction in relation to data transmission. In one case, a data processing system is disclosed that includes: a two stage tone reduction circuit including a first stage circuit and a second stage circuit; and a polarity change circuit operable to change a polarity of the second stage output to yield a tone reduction output.

24 Claims, 4 Drawing Sheets

(56) References Cited

U.S. PATENT DOCUMENTS

| | | |
|---|---|---|
| 2010/0042890 A1 | 2/2010 | Gunnam et al. |
| 2010/0287436 A1 | 11/2010 | Lastras-Montano |
| 2011/0109773 A1 | 5/2011 | Dekel |
| 2011/0161774 A1 | 6/2011 | Shin et al. |
| 2011/0164745 A1 | 7/2011 | Marzetta et al. |
| 2012/0005551 A1 | 1/2012 | Gunnam et al. |
| 2012/0288003 A1 | 11/2012 | Do et al. |
| 2013/0007570 A1 | 1/2013 | Seago |
| 2013/0024163 A1 | 1/2013 | Xia |
| 2013/0086446 A1 | 4/2013 | Yeung et al. |

OTHER PUBLICATIONS

Lin et al "An efficient VLSI Architecture for non binary LDPC decoders"—IEEE Transaction on Circuits and Systems II vol. 57, Issue 1 (Jan. 2010) pp. 51-55.

Perisa et al "Frequency Offset Estimation Based on Phase Offsets Between Sample Correlations" Dept. of Info. Tech. University of Ulm 2005.

U.S. Appl. No. 13/654,417, filed Oct. 18, 2012, Fan Zhang, Unpublished.

U.S. Appl. No. 13/766,857, filed Feb. 14, 2013, Shaohua Yang, Unpublished.

U.S. Appl. No. 13/707,898, filed Dec. 7, 2012, Razmik Karabed, Unpublished.

U.S. Appl. No. 13/426,722, filed Mar. 22, 2012, Fan Zhang, Unpublished.

U.S. Appl. No. 13/452,733, filed Apr. 20, 2012, Shaohua Yang, Unpublished.

U.S. Appl. No. 13/450,289, filed Apr. 18, 2012, Shaohua Yang, Unpublished.

U.S. Appl. No. 13/284,754, filed Oct. 28, 2011, Fan Zhang, Unpublished.

U.S. Appl. No. 13/363,751, filed Feb. 1, 2012, Lei Chen, Unpublished.

\* cited by examiner

SYSTEMS AND METHODS FOR TWO STAGE TONE REDUCTION

CROSS REFERENCE TO RELATED APPLICATIONS

The present application claims priority to (is a non-provisional of) U.S. Pat. App. No. 61/874,315 entitled "Systems and Methods for Two Stage Tone Reduction", and filed Sep. 5, 2013 by Nayak Ratnakar Aravind et al. The entirety of the aforementioned provisional patent application is incorporated herein by reference for all purposes.

FIELD OF THE INVENTION

Systems and methods relating generally to data processing, and more particularly to systems and methods for tone reduction in relation to data transmission.

BACKGROUND

Data transfers often include transferring data to/from a medium. Such transfers are done by systems that may exhibit various sources of noise. These sources of noise may include, but are not limited to, power supplies and noise generated from one or more elements on a printed circuit board. This noise often creates data integrity issues that result in a reduction in the effective transfer rate and/or error rate related to the data transfer.

Hence, for at least the aforementioned reasons, there exists a need in the art for advanced systems and methods for noise reduction.

SUMMARY

Systems and methods relating generally to data processing, and more particularly to systems and methods for tone reduction in relation to data transmission.

Some embodiments of the present invention provide data processing systems that include a two stage tone reduction circuit and a polarity change circuit. The two stage tone reduction circuit includes a first stage circuit and a second stage circuit, where the first stage circuit is the same as the second stage circuit. The first stage circuit applies a tone reduction filtering to a data input to yield a first stage output, and the second stage circuit applies the tone reduction filtering to the first stage output to yield a second stage output. The polarity change circuit is operable to change a polarity of the second stage output to yield a tone reduction output.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and method relating generally to data processing, and more particularly to systems and methods for encoding and decoding information.

Various embodiments of the present invention provide data processing systems that include two stage tone reduction circuitry. In some cases, this two stage tone reduction circuitry provides an ability to eliminate a tone known to a user by programming the circuitry to operate in vicinity of the tone. In various instances of the aforementioned embodiments, the two stage tone reduction circuitry is operable to selectively eliminate a programmed tone from a data input that is provided to a data processing circuit. The data processing circuit includes a data detector circuit and a data decoder circuit. The data detector circuit is operable to apply a data detection algorithm to the data input to yield a detected output, and the data decoder circuit is operable to apply a data decode algorithm to a decoder input derived from the detected output to yield a decoded output. Processing a codeword through both the data detector circuit and the data decoder circuit is generally referred to as a "global iteration". During a global iteration, the data decode algorithm may be repeated applied. Each application of the data decode algorithm during a given global iteration is referred to as a "local iteration".

Some embodiments of the present invention provide data processing systems that include a two stage tone reduction circuit and a polarity change circuit. The two stage tone reduction circuit includes a first stage circuit and a second stage circuit, where the first stage circuit is the same as the second stage circuit. The first stage circuit applies a tone reduction filtering to a data input to yield a first stage output, and the second stage circuit applies the tone reduction filtering to the first stage output to yield a second stage output. The polarity change circuit is operable to change a polarity of the second stage output to yield a tone reduction output.

In some instances of the aforementioned embodiments, the data processing system further includes an equalizer circuit and a summation circuit. The equalizer circuit is operable to equalize a received data set to yield an equalized data set. The summation circuit is operable to subtract the tone reduction output from the equalized data set to yield a processing data set. In some cases, the equalizer circuit is a first equalizer circuit, the equalized data set is a first equalized data set, and the data processing system further includes: a second equalizer circuit operable to equalize the received data set to yield a second equalized data set; a loop processor circuit operable to generate an ideal output based at least in part on the equalizer circuit; and a summation circuit operable to subtract the ideal output from the first equalized data set to yield the data input.

In various instances of the aforementioned embodiments, the polarity change circuit is a multiplier circuit operable to multiply the second stage output by a negative one (−1). In one or more instances of the aforementioned embodiments, the first stage circuit includes a difference circuit and a filter circuit. The filter circuit is operable to filter an output of the difference circuit to yield the first stage output. In some cases, the difference circuit includes a delay circuit and a summation circuit. The delay circuit is operable to delay the data input by a period to yield a delayed output, and the summation circuit is operable to add the delayed output to the data input. In various cases, the filter circuit includes: a summation circuit operable to add the output of the difference circuit to a modified value to yield the first stage output; a first delay circuit operable to delay the first stage output by a period to yield a first delayed output; a second delay circuit operable to delay the first delayed output by a period to yield a second delayed output; a multiplier circuit operable to multiply the first delayed output by a program value to yield a product; and a summation circuit operable to add the product to an input derived from the second delayed output to yield the modified value.

Other embodiments of the present invention provide methods for data processing that include: receiving a data set; equalizing the data set to yield an equalized output; using a loop detector circuit to generate an ideal output corresponding the data set; subtracting the ideal output from the equalized output to yield an error output; applying a first stage filtering using a first stage filter circuit to the error output to yield a first stage output; applying a second stage filtering using a second stage filter circuit to the first stage output to yield a second stage output, wherein the first stage circuit is identical to the second stage circuit; and modifying a polarity of the second stage output to yield a tone reduction output.

In some instances of the aforementioned embodiments, modifying the polarity includes multiplying the second stage output by a negative one. In various instances of the aforementioned embodiments, the first stage circuit includes a difference circuit, and a filter circuit. The filter circuit is operable to filter an output of the difference circuit to yield the first stage output. In some cases, the difference circuit includes a delay circuit operable to delay the data input by a period to yield a delayed output, and a summation circuit operable to add the delayed output to the data input. In one or more cases, the filter circuit includes: a summation circuit operable to add the output of the difference circuit to a modified value to yield the first stage output; a first delay circuit operable to delay the first stage output by a period to yield a first delayed output; a second delay circuit operable to delay the first delayed output by a period to yield a second delayed output; a multiplier circuit operable to multiply the first delayed output by a program value to yield a product; and a summation circuit operable to add the product to an input derived from the second delayed output to yield the modified value.

Figure 1:
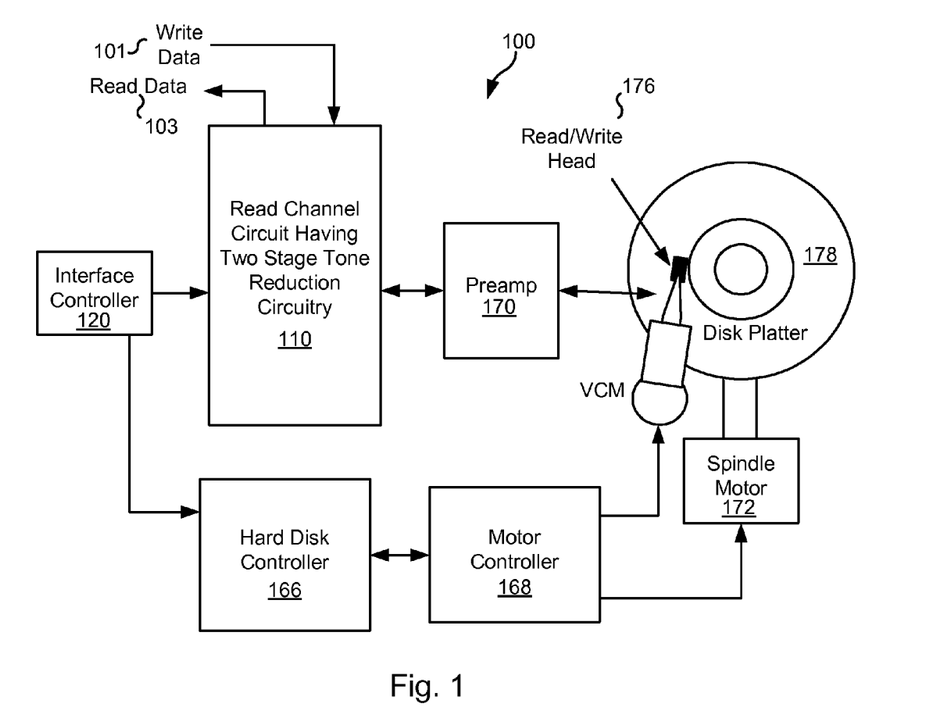
FIG. 1 shows a storage system including a read channel circuit having two stage tone reduction circuitry in accordance with one or more embodiments of the present invention.

Turning to FIG. 1, a storage system 100 is shown that includes a read channel 110 circuit having two stage tone reduction circuitry in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178, and interacts with a host controller (not shown). The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head 176 is accurately positioned by motor controller 168 over a desired data track on disk platter 178. Motor controller 168 both positions read/write head 176 in relation to disk platter 178 and drives spindle motor 172 by moving read/write head assembly 176 to the proper data track on disk platter 178 under the direction of hard disk controller 166. Spindle motor 172 spins disk platter 178 at a determined spin rate (RPMs). Once read/write head 176 is positioned adjacent the proper data track, magnetic signals representing data on disk platter 178 are sensed by read/write head 176 as disk platter 178 is rotated by spindle motor 172. The sensed magnetic signals are provided as a continuous, minute analog signal representative of the magnetic data on disk platter 178. This minute analog signal is transferred from read/write head 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

In operation, data is accessed from disk platter 178. Two stage tone reduction is applied to the data using the two stage tone reduction circuitry to yield a processed output. This processed output is then decoded to yield the data set that was the original basis of the data written to disk platter 178. The tone reduced by the two stage tone reduction circuitry is user programmable based upon the user's knowledge of the noise characteristics of storage system 100. In some cases, the processing of the data accessed from disk platter 178 may be implemented similar to that discussed below in relation to FIG. 4. In particular cases, the two stage tone reduction circuitry may be implemented similar to that discussed below in relation to FIG. 5. In various cases, the data processing may be implemented similar to that discussed below in relation to FIGS. 6*a*-6*b*.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk.

For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
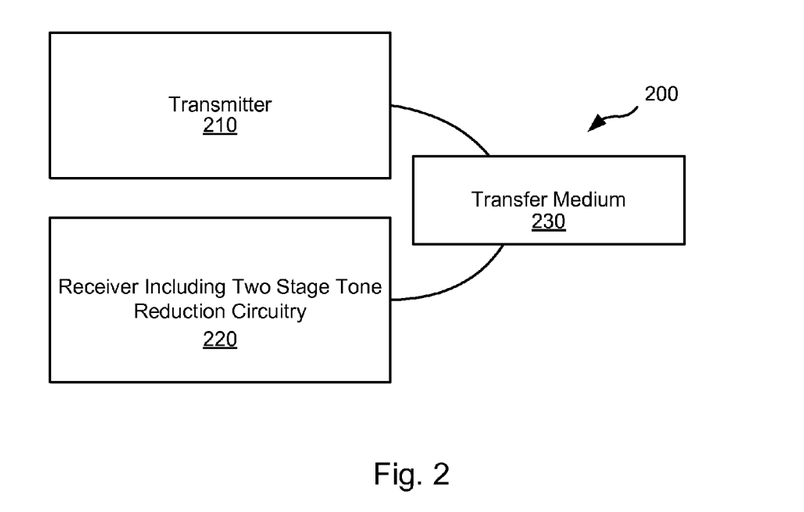
FIG. 2 shows a data transmission system including a receiver having two stage tone reduction circuitry in accordance with some embodiments of the present invention

Turning to FIG. 2, a data transmission system 200 including a receiver 220 having two stage tone reduction circuitry in accordance with one or more embodiments of the present invention. Transmitter 210 transmits encoded data via a transfer medium 230 as is known in the art. The encoded data is received from transfer medium 230 by receiver 220.

During operation, data received by receiver 220 is processed using the two stage tone reduction circuit to yield a processed output. This processed output is then decoded to yield the data set that was the original basis of the data transferred via transfer medium 230. The tone reduced by the two stage tone reduction circuitry is user programmable based upon the user's knowledge of the noise characteristics of the data transmission system 200. In some cases, the processing of the data received via transfer medium 230 may be implemented similar to that discussed below in relation to FIG. 4. In particular cases, the two stage tone reduction circuitry may be implemented similar to that discussed below in relation to FIG. 5. In various cases, the data processing may be implemented similar to that discussed below in relation to FIGS. 6a-6b.

Figure 3:
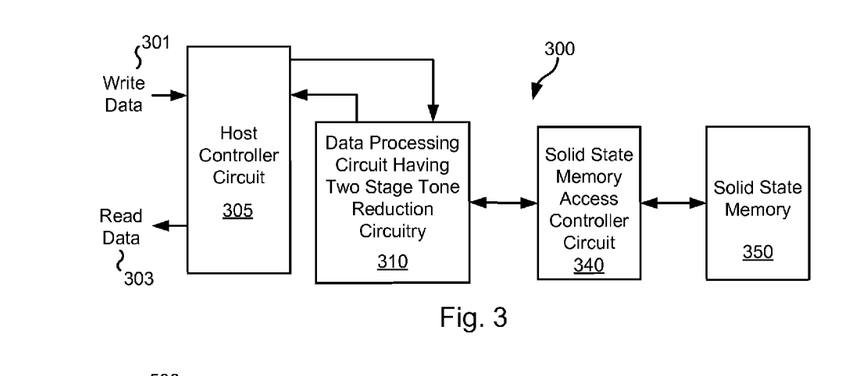
FIG. 3 shows another storage system including a data processing circuit having two stage tone reduction circuitry in accordance with various embodiments of the present invention.

Turning to FIG. 3, another storage system 300 is shown that includes a data processing circuit 310 having two stage tone reduction circuitry in accordance with one or more embodiments of the present invention. A host controller circuit 305 receives data to be stored (i.e., write data 301). This data is encoded prior to writing to a solid state memory 350 via a solid state memory access controller circuit 340. Solid state memory access controller circuit 340 may be any circuit known in the art that is capable of controlling access to and from a solid state memory. Solid state memory access controller circuit 340 formats the received encoded data for transfer to a solid state memory 350. Solid state memory 350 may be any solid state memory known in the art. In some embodiments of the present invention, solid state memory 350 is a flash memory. Later, when the previously written data is to be accessed from solid state memory 350, solid state memory access controller circuit 340 requests the data from solid state memory 350 and provides the requested data to data processing circuit 310. Two stage tone reduction is applied to the data using the two stage tone reduction circuitry to yield a processed output. This processed output is then decoded to yield the data set that was the original basis of the data written to solid state memory 350. The tone reduced by the two stage tone reduction circuitry is user programmable based upon the user's knowledge of the noise characteristics of storage system 300. In some cases, the processing of the data accessed from solid state memory 350 may be implemented similar to that discussed below in relation to FIG. 4. In particular cases, the two stage tone reduction circuitry may be implemented similar to that discussed below in relation to FIG. 5. In various cases, the data processing may be implemented similar to that discussed below in relation to FIGS. 6a-6b.

Figure 4:
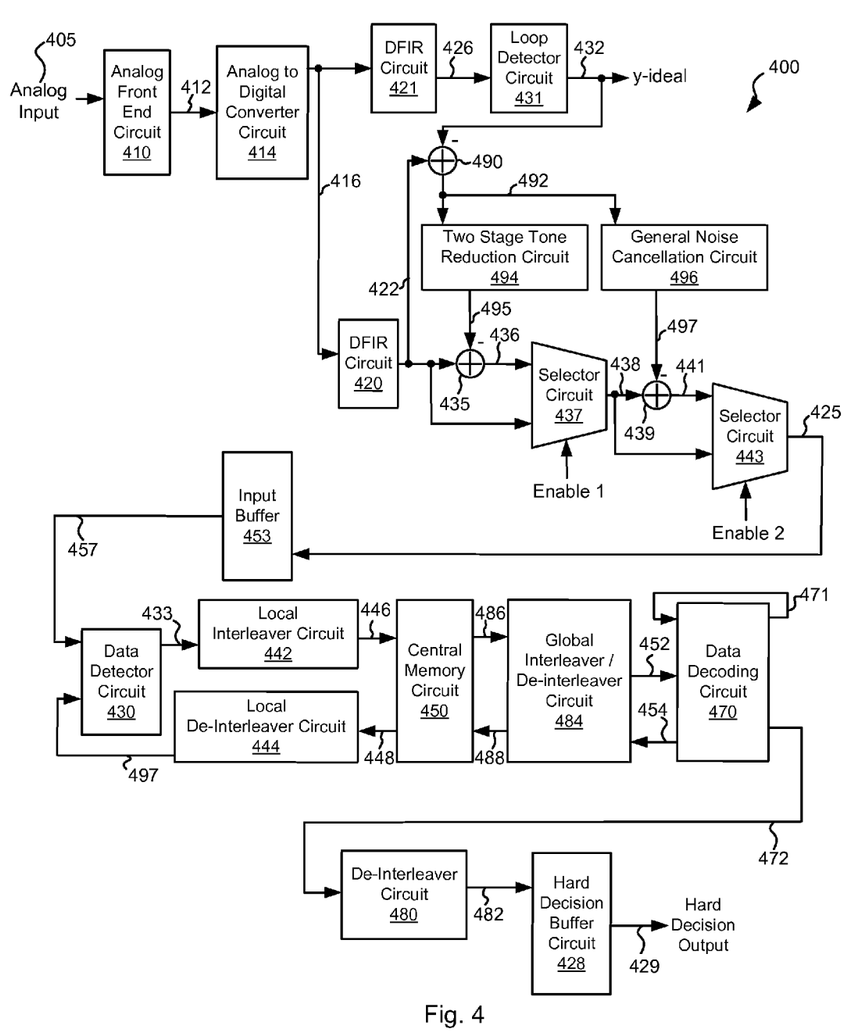
FIG. 4 is a data processing system including a two stage tone reduction circuit in accordance with some embodiments of the present invention.

Turning to FIG. 4, a data processing system 400 including a two stage tone reduction circuit 494 in accordance with some embodiments of the present invention. Data processing system 400 includes an analog front end circuit 410 that receives an analog signal 405. Analog front end circuit 410 processes analog signal 405 and provides a processed analog signal 412 to an analog to digital converter circuit 414. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog signal 405 is derived from a read/write head assembly (not shown) that is disposed in relation to a storage medium (not shown). In other cases, analog signal 405 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 405 may be derived.

Analog to digital converter circuit 414 converts processed analog signal 412 into a corresponding series of digital samples 416. Analog to digital converter circuit 414 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 416 are provided to two equalizer circuits 420, 421. Equalizer circuit 420 applies an equalization algorithm to digital samples 416 to yield an equalized output 422; and equalizer circuit 421 applies an equalization algorithm to digital samples 416 to yield an equalized output 426. In some embodiments of the present invention, both equalizer circuit 420 and equalizer circuit 421 are digital finite impulse response filter circuit as are known in the art.

Equalized output 426 is provided to a loop detector circuit 431 that applies a detection algorithm to the equalized output to yield an ideal output 432 (y-ideal). Loop detector circuit 431 may be any circuit known in the art that is capable of yielding an ideal output from an equalized output. Ideal output 432 is subtracted from equalized output 422 by a summation circuit 490 to yield an error value 492. Error value 492 may be represented by the following equation:

Error Value 492=equalized output 422−ideal output 432.

Error value 492 is provided to two stage tone reduction circuit 494 and a general noise cancellation circuit 496. Two stage tone reduction circuit 494 is a programmable circuit operable to block a tone programmed by a user. Two stage tone reduction circuit 494 uses a two stage filtering approach to account for phase delay effects in tone estimates. In some implementations, two stage tone reduction circuit 494 is implemented as a full rate filter. In other cases, two stage tone reduction circuit 494 may be implemented as a quarter-rate or an octal-rate filter. The user programs the desired center frequency of the band around the interfering tone identified by the user. Two stage tone reduction circuit 494 internally generates filter coefficients needed to implement a band pass filter. Error values 492 are filtered to generate an estimate of the interfering tone. The interfering tone estimate is aligned with samples used for subsequent data detection, and the interfering tone is canceled to improve performance during data processing. General noise cancellation circuit 496 is a low pass filter operable to block noise at or near DC.

Two stage tone reduction circuit 494 filters error value 492 to yield a tone filtered correction value 495, and general noise cancellation circuit 496 filters error value 492 to yield a low frequency correction value 497. Tone filtered correction value 495 is provided to a summation circuit 435 where it is subtracted from equalized output 422 to yield a corrected output 436. A selector circuit 437 selects one of equalized output 422 or corrected output 436 as a selected output 438. Selection between equalized output 422 and corrected output 436 is based upon an enable 1 input. Enable 1 is user programmable and allows for selection of a corrected output or an uncorrected output. Low frequency correction value 497 is provided to a summation circuit 439 where it is subtracted from selected output 438 to yield a corrected output 441. A selector circuit 443 selects one of selected output 438 or corrected output 441 as a selected output 425. Selection between selected output 438 and corrected output 441 is based upon an enable 2 input. Enable 2 is user programmable and allows for selection of a corrected output or an uncorrected output.

Selected output 425 is stored to an input buffer 453 that includes sufficient memory to maintain a number of codewords until processing of that codeword is completed through a data detector circuit 430 and data decoding circuit 470 including, where warranted, multiple global iterations (passes through both data detector circuit 430 and data decoding circuit 470) and/or local iterations (passes through data decoding circuit 470 during a given global iteration). An output 457 is provided to data detector circuit 430.

Data detector circuit 430 may be a single data detector circuit or may be two or more data detector circuits operating in parallel on different codewords. Whether it is a single data detector circuit or a number of data detector circuits operating in parallel, data detector circuit 430 is operable to apply a data detection algorithm to a received codeword or data set. In some embodiments of the present invention, data detector circuit 430 is a Viterbi algorithm data detector circuit as are known in the art. In other embodiments of the present invention, data detector circuit 430 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 430 is used to apply the data detection algorithm to the received codeword for a first global iteration applied to the received codeword, and another data detector circuit included in data detector circuit 430 is operable apply the data detection algorithm to the received codeword guided by a decoded output accessed from a central memory circuit 450 on subsequent global iterations.

Upon completion of application of the data detection algorithm to the received codeword on the first global iteration, data detector circuit 430 provides a detector output 433. Detector output 433 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 433 is provided to a local interleaver circuit 442. Local interleaver circuit 442 is operable to shuffle sub-portions (i.e., local chunks) of the data set included as detected output and provides an interleaved codeword 446 that is stored to central memory circuit 450. Interleaver circuit 442 may be any circuit known in the art that is capable of shuffling data sets to yield a re-arranged data set. Interleaved codeword 446 is stored to central memory circuit 450.

When data decoding circuit 470 is available, a previously stored interleaved codeword 446 is accessed from central memory circuit 450 as a stored codeword 486 and globally interleaved by a global interleaver/de-interleaver circuit 484. Global interleaver/de-interleaver circuit 484 may be any circuit known in the art that is capable of globally rearranging codewords. Global interleaver/De-interleaver circuit 484 provides a decoder input 452 into data decoding circuit 470. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 470 applies a data decode algorithm to decoder input 452 to yield a decoded output 471. In cases where another local iteration (i.e., another pass trough data decoder circuit 470) is desired, data decoding circuit 470 re-applies the data decode algorithm to decoder input 452 guided by decoded output 471. This continues until either a maximum number of local iterations is exceeded or decoded output 471 converges (i.e., completion of standard processing as indicated by no remaining errors).

Where decoded output 471 fails to converge (i.e., fails to yield the originally written data set) and a number of local iterations through data decoder circuit 470 exceeds a threshold, the resulting decoded output is provided as a decoded output 454 back to central memory circuit 450 where it is stored awaiting another global iteration through a data detector circuit included in data detector circuit 430. Prior to storage of decoded output 454 to central memory circuit 450, decoded output 454 is globally de-interleaved to yield a globally de-interleaved output 488 that is stored to central memory circuit 450. The global de-interleaving reverses the global interleaving earlier applied to stored codeword 486 to yield decoder input 452. When a data detector circuit included in data detector circuit 430 becomes available, a previously stored de-interleaved output 488 is accessed from central memory circuit 450 and locally de-interleaved by a de-interleaver circuit 444. De-interleaver circuit 444 re-arranges decoder output 448 to reverse the shuffling originally performed by interleaver circuit 442. A resulting de-interleaved output 497 is provided to data detector circuit 430 where it is used to guide subsequent detection of a corresponding data set previously received as selected output 425.

Alternatively, where the decoded output converges (i.e., yields the originally written data set), the resulting decoded output is provided as an output codeword 472 to a de-interleaver circuit 480 that rearranges the data to reverse both the global and local interleaving applied to the data to yield a de-interleaved output 482. De-interleaved output 482 is provided to a hard decision buffer circuit 428 buffers de-interleaved output 482 as it is transferred to the requesting host as a hard decision output 429.

It should be noted that while application of tone filtered correction value 495 to the data destined for the input buffer 453 is shown as preceding application of low frequency correction value 497 to the data, other embodiments of the present invention may apply low frequency correction value 497 prior to application of tone filtered correction value 495 to data destined for the input buffer 453.

Figure 5:
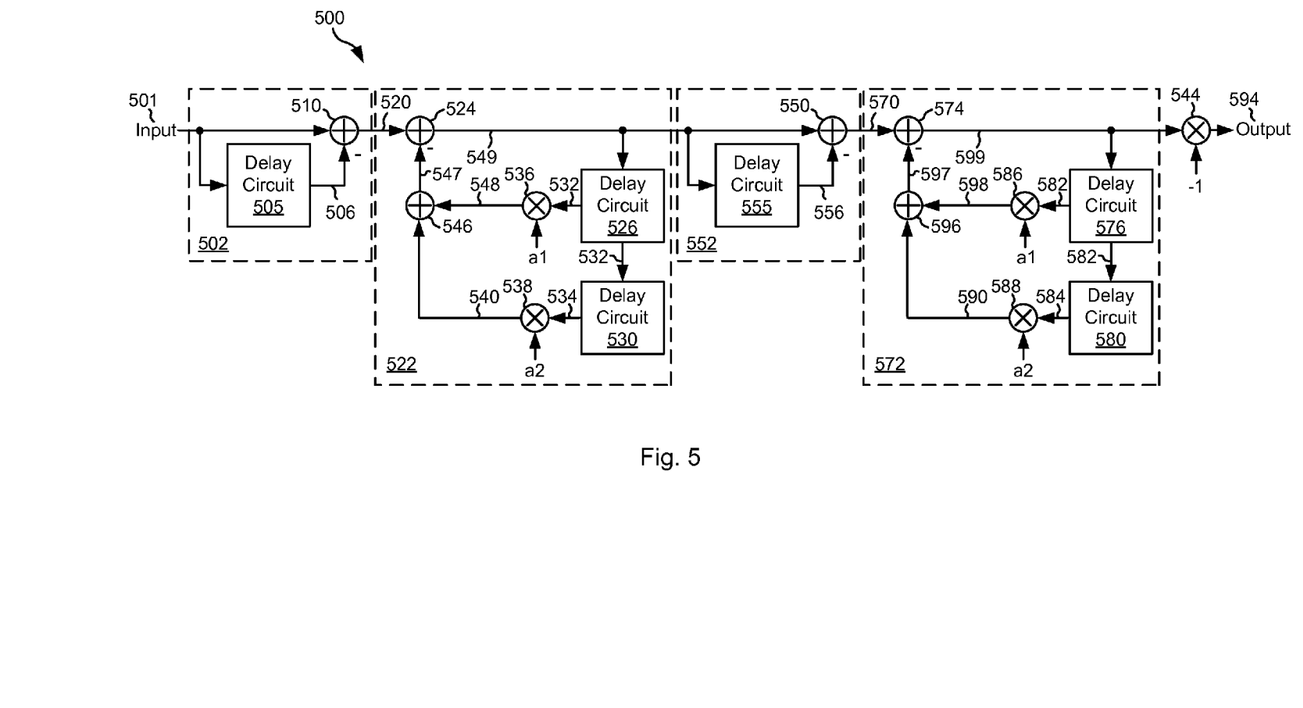
FIG. 5 depicts a two stage tone reduction circuit in accordance with various embodiments of the present invention.

Turning to FIG. 5, and detailed bock diagram of a two stage tone reduction circuit 500 is shown in accordance with various embodiments of the present invention. Two stage tone reduction circuit 500 includes a first stage including a first difference circuit 502 and a first auto regressive filter 522, and a second stage including a second difference circuit 552 and a second auto regressive filter 572. The first stage provides the desired filtering to yield a first tone filtered correction value 529. The second stage is identical to the first stage and re-filters first tone filtered correction value 549 to yield a second tone filtered correction value 594.

First difference circuit 502 includes a delay circuit 505 that delays input 501 for a number of sample periods of the received data (i.e., error value 492) to yield a delayed output 506. In one particular embodiment of the present invention, the number of sample periods is sixty-four (64). In other embodiments of the present invention, the number of sample periods is one hundred, twenty-eight (128). Increasing the number of sample periods yields increased sharpness in the band-pass filter at the expense of increased processing latency and increased circuitry. Based upon the disclosure provided herein, one of ordinary skill in the art will recognize a variety of values for the number of sample periods. Delayed output 506 is provided to a summation circuit 510 where it is subtracted from the current instance of input 501 to yield a difference value 520. As such, the first stage operates on differences in input 501.

Difference value 520 is provided to first auto regressive filter 522 that includes a summation circuit 524. Summation circuit 524 subtracts a modified value 547 from difference value 520 to yield first tone filtered correction value 549. First tone filtered correction value 549 is provided to a delay circuit 526 that delays first tone filtered correction value 549 by a number of sample periods of the received data (i.e., error value 492) to yield a delayed output 532. Delayed output 532 is provided to a multiplication circuit 536 where it is multiplied by a user programmable input (a1) to yield a product 548. In addition, delayed output 532 is provided to a delay circuit 530 that delays delayed output 532 by one sample period of the received data (i.e., error value 492) to yield a delayed output 534. Delayed output 534 is provided to a multiplication circuit 538 where it is multiplied by a user programmable input (a2) to yield a product 540. A summation circuit 546 sums product 540 with product 548 to yield modified value 547.

The combination of user programmable input (a1) and user programmable input (a2) are used to set a conjugate pole pair that defines the center of the filter pass band at different frequencies. The transfer function of the first stage is defined by the following equation:

$$\text{Output} = \frac{1}{\left(1 - 2\cos\left(\frac{2\pi f}{W}\right)z^{-1} + z^{-2}\right)},$$

where W is the width of the filter, and f is the desired center frequency. In some embodiments of the present invention, f is selectable as a value between 0 and 64 and W is fixed at 128. By fixing user programmable input (a2) as unity ('1'), the value of user programmable input (a1) is defined as:

$$a1 = -2\cos\left(\frac{2\pi f}{W}\right).$$

Thus, the user selects the desired frequency (f) and calculates the corresponding value for user programmable input (a1).

The phase delay of the first stage is set forth in the following equation:

$$\text{phase delay} = \frac{2\pi f}{W} - \frac{\pi}{2}.$$

Based upon this phase delay, the filter delay for the first stage is defined as follows:

$$\text{filter delay} = \left(\frac{2\pi f}{W} - \frac{\pi}{2}\right)\frac{W}{2\pi f} = 1\frac{W}{4f}.$$

As will be appreciated from the preceding equation, the filter delay for the first stage is a function of the user selected frequency. As such, the circuit is only usable in a very narrow band. To increase the band, the aforementioned second stage is added.

Second difference circuit 552 includes a delay circuit 555 that delays first tone filtered correction value 549 for a number of sample periods of the received data (i.e., error value 492) to yield a delayed output 556. Delayed output 556 is provided to a summation circuit 550 where it is subtracted from the current instance of first tone filtered correction value 549 to yield a difference value 570. As such, the second stage operates on differences in first tone filtered correction value 549.

Difference value 570 is provided to second auto regressive filter 572 that includes a summation circuit 574. Summation circuit 574 subtracts a modified value 597 from difference value 570 to yield second tone filtered correction value 599. Second tone filtered correction value 599 is provided to a delay circuit 576 that delays second tone filtered correction value 599 by a number of sample periods of the received data (i.e., error value 492) to yield a delayed output 582. Delayed output 582 is provided to a multiplication circuit 586 where it is multiplied by user programmable input (a1) to yield a product 598. In addition, delayed output 582 is provided to a delay circuit 580 that delays delayed output 582 by a number of sample periods of the received data (i.e., error value 492) to yield a delayed output 584. Delayed output 584 is provided to a multiplication circuit 588 where it is multiplied by user programmable input (a2) to yield a product 590. A summation circuit 596 sums product 590 with product 598 to yield modified value 597.

The phase delay of the combination of the first stage and the second stage is set forth in the following equation:

$$\text{phase delay} = 2\left(\frac{2\pi f}{W} - \frac{\pi}{2}\right) + \pi = \frac{4\pi f}{W}.$$

The $\pi$ term accounts for the negative multiplication, and the preceding equation shows the combined effect of the two stages and the multiplication by negative one (−1). Based upon this phase delay, the filter delay for the first stage is defined as follows:

$$\text{filter delay} = \left(\frac{4\pi f}{W}\right)\frac{W}{2\pi f} = 2.$$

As will be appreciated from the preceding equation, the filter delay for the combination of the first stage and the second stage is not a function of the user selected frequency. As such, the circuit is more broadly applicable than the first stage alone. second tone filtered correction value 599 is provided to a multiplier circuit 544 where it is multiplied by a negative one (−1) to yield the final output 594. Where two stage tone reduction circuit 500 is used in place of two stage tone reduction circuit 494 of FIG. 4, error value 492 is connected to input 501, and output 594 is connected to tone filtered correction value 495.

Figure 6:
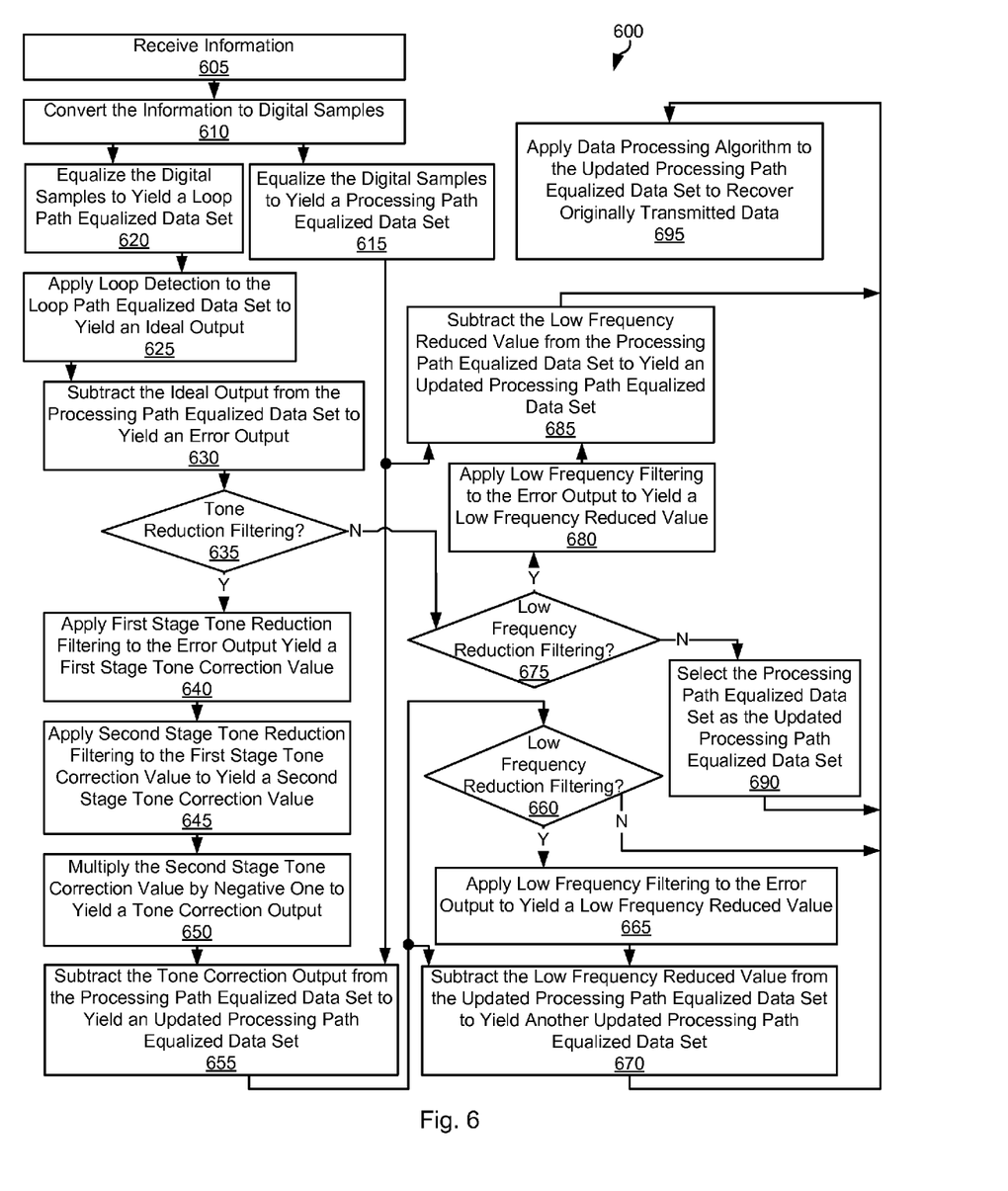
FIG. 6 is a flow diagram showing a method in accordance with some embodiments of the present invention for data processing including two stage tone reduction in accordance with one or more embodiments of the present invention.

Turning to FIG. 6, a flow diagram 600 shows a method in accordance with some embodiments of the present invention for data processing including two stage tone reduction in accordance with one or more embodiments of the present invention. Following flow diagram 600, information is received (block 605). This information may be derived from sensing a storage medium or via a data transmission medium. Based upon the disclosure provided herein, one of ordinary skill in the art will recognize a variety of sources from which the information may be received.

The received information is converted to digital samples (block 610). The digital samples are equalized to yield a loop path equalized data set (block 620) and to yield a processing path equalized data set (block 615). Loop detection is applied to the loop path equalized data set to yield an ideal output (block 625), and the ideal output is subtracted from the processing path equalized data set to yield an error output (block 630).

It is determined whether tone reduction filtering is to be applied (block 635). Where tone reduction filtering is to be applied (block 635), first stage tone reduction filtering is applied to the error output to yield a first stage tone correction value (block 640). The first stage tone correction value exhibits a transfer function as set forth in the following equation:

$$\text{Output} = \frac{1}{\left(1 - 2\cos\left(\frac{2\pi f}{W}\right)z^{-1} + z^{-2}\right)},$$

where W is the width of the filter, and f is the desired center frequency. In some embodiments of the present invention, f is selectable as a value between 0 and 64 and W is fixed at 128. By fixing user programmable input (a2) as unity ('1'), the value of user programmable input (a1) is defined as:

$$a1 = -2\cos\left(\frac{2\pi f}{W}\right).$$

Thus, the user selects the desired frequency (f) and calculates the corresponding value for user programmable input (a1). The phase delay of the first stage is set forth in the following equation:

$$\text{phase delay} = \frac{2\pi f}{W} - \frac{\pi}{2}.$$

Based upon this phase delay, the filter delay for the first stage is defined as follows:

$$\text{filter delay} = \left(\frac{2\pi f}{W} - \frac{\pi}{2}\right)\frac{W}{2\pi f} = 1 - \frac{W}{4f}.$$

As will be appreciated from the preceding equation, the filter delay for the first stage is a function of the user selected frequency. As such, the circuit is only usable in a very narrow band. To increase the band, the aforementioned second stage is added.

Second stage tone reduction filtering is applied to the first stage tone correction value to yield a second stage tone correction value (block 645). The second stage tone reduction filtering is identical to the first stage tone reduction filtering. The phase delay of the combination of the first stage tone correction filtering followed by the second stage tone reduction filtering is set forth in the following equation:

$$\text{phase delay} = 2\left(\frac{2\pi f}{W} - \frac{\pi}{2}\right) + \pi = \frac{4\pi f}{W}.$$

The $\pi$ term accounts for the negative multiplication, and the preceding equation shows the combined effect of the two stages and the multiplication by negative one (−1). Based upon this phase delay, the filter delay for the first stage is defined as follows:

$$\text{filter delay} = \left(\frac{4\pi f}{W}\right)\frac{W}{2\pi f} = 2.$$

As will be appreciated from the preceding equation, the filter delay for the combination of the first stage and the second stage is not a function of the user selected frequency. As such, such two stage tone reduction filtering yields a more broadly applicable filtering. The second stage tone correction value is multiplied by negative one (−1) to yield a tone correction output (block 650). The tone correction output is then subtracted from the processing path equalized data set to yield an updated processing path equalized data set (block 655).

It is determined whether low frequency reduction filtering is to be applied (block 660). Where low frequency reduction filtering is to be applied (block 660), low frequency filtering is applied to the error output (from block 630) to yield a low frequency reduced value (block 665). The low frequency reduced value is subtracted from the updated processing path equalized data set (from block 655) to yield another updated processing path equalized data set (block 670). Alternatively, where low frequency reduction filtering is not to be applied (block 660), the updated processing path equalized data set from block 655 remains the updated processing path equalized data set.

Alternatively, where tone reduction filtering is not to be applied (block 635), it is determined whether low frequency reduction filtering is to be applied (block 675). Where low frequency reduction filtering is to be applied (block 675), low frequency filtering is applied to the error output (from block 630) to yield a low frequency reduced value (block 680). The low frequency reduced value is subtracted from the processing path equalized data set to yield an updated processing path equalized data set (block 685). Alternatively, where low frequency reduction filtering is not to be applied (block 675), the processing path equalized data set (from block 615) is selected as an updated processing path equalized data set (block 690).

Data processing is then applied to the updated processing path equalized data set to recover originally transmitted data (block 695). This data processing may include, but is not limited to, application of a data detection algorithm and/or a data decoding algorithm to the updated processing path equalized data set. It should be noted that while determining application of tone reduction filtering is shown as preceding the determination of application of the low frequency reduction filtering, other embodiments of the present invention may determine application of the low frequency reduction filtering before determining application of tone reduction filtering.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a two stage tone reduction circuit including a first stage circuit and a second stage circuit, wherein the first stage circuit is the same as the second stage circuit, wherein the first stage circuit applies a tone reduction filtering to a data input to yield a first stage output, and wherein the second stage circuit applies the tone reduction filtering to the first stage output to yield a second stage output; and
    a polarity change circuit operable to change a polarity of the second stage output to yield a tone reduction output, wherein the polarity change circuit is a multiplier circuit operable to multiply the second stage output by a negative one.

2. The data processing system of claim 1, wherein the data processing system further comprises:
    an equalizer circuit operable to equalize a received data set to yield an equalized data set; and
    a summation circuit operable to subtract the tone reduction output from the equalized data set to yield a processing data set.

3. The data processing system of claim 2, wherein the equalizer circuit is a first equalizer circuit, wherein the equalized data set is a first equalized data set, and wherein the data processing system further comprises:
    a second equalizer circuit operable to equalize the received data set to yield a second equalized data set;
    a loop processor circuit operable to generate an ideal output based at least in part on the equalizer circuit; and
    a summation circuit operable to subtract the ideal output from the first equalized data set to yield the data input.

4. The data processing system of claim 1, wherein the polarity change circuit is a multiplier circuit operable to multiply the second stage output by a negative one.

5. The data processing system of claim 1, wherein the first stage circuit includes:
    a difference circuit; and
    a filter circuit operable to filter an output of the difference circuit to yield the first stage output.

6. The data processing system of claim 5, wherein the difference circuit comprises:
    a delay circuit operable to delay the data input by at least one period to yield a delayed output; and
    a summation circuit operable to add the delayed output to the data input.

7. The data processing system of claim 5, wherein the filter circuit comprises:
    a summation circuit operable to add the output of the difference circuit to a modified value to yield the first stage output;

a first delay circuit operable to delay the first stage output by at least one period to yield a first delayed output;

a second delay circuit operable to delay the first delayed output by at least one period to yield a second delayed output;

a multiplier circuit operable to multiply the first delayed output by a program value to yield a product; and a summation circuit operable to add the product to an input derived from the second delayed output to yield the modified value.

8. The data processing system of claim 1, wherein the system is implemented as an integrated circuit.

9. The data processing system of claim 1, wherein the data processing system is incorporated in a device selected from a group consisting of: a storage device, and a data transmission device.

10. The data processing system of claim 1, wherein the data processing system is incorporated in a storage device selected from a group consisting of: a hard disk drive, and a solid state drive.

11. A method for data processing, the method comprising:
receiving a data set;
equalizing the data set to yield an equalized output;
using a loop detector circuit to generate an ideal output corresponding the data set;
subtracting the ideal output from the equalized output to yield an error output;
applying a first stage filtering using a first stage filter circuit to the error output to yield a first stage output;
applying a second stage filtering using a second stage filter circuit to the first stage output to yield a second stage output, wherein the first stage circuit is identical to the second stage circuit; and
modifying a polarity of the second stage output to yield a tone reduction output.

12. The method of claim 11, wherein modifying the polarity includes multiplying the second stage output by a negative one.

13. The method of claim 11, wherein the first stage circuit includes:
a difference circuit; and
a filter circuit operable to filter an output of the difference circuit to yield the first stage output.

14. The method of claim 13, wherein the difference circuit comprises:
a delay circuit operable to delay the data input by at least one period to yield a delayed output; and
a summation circuit operable to add the delayed output to the data input.

15. The method of claim 13, wherein the filter circuit comprises:
a summation circuit operable to add the output of the difference circuit to a modified value to yield the first stage output;
a first delay circuit operable to delay the first stage output by at least one period to yield a first delayed output;
a second delay circuit operable to delay the first delayed output by at least one period to yield a second delayed output;
a multiplier circuit operable to multiply the first delayed output by a program value to yield a product; and
a summation circuit operable to add the product to an input derived from the second delayed output to yield the modified value.

16. A storage device, the storage device comprising:
a storage medium;
a head assembly operable to provide a sensed signal corresponding to information on the storage medium;
an analog to digital converter circuit operable to convert an analog input derived from the sensed signal to a series of digital samples;
an equalizer circuit operable to equalized the digital samples to yield an equalized output;
a loop detector circuit operable to yield an ideal output corresponding to the series of digital samples;
a summation circuit operable to subtract the ideal output from the equalized output to yield an error output;
a two stage tone reduction circuit including a first stage circuit and a second stage circuit, wherein the first stage circuit is the same as the second stage circuit, wherein the first stage circuit applies a tone reduction filtering to the error output to yield a first stage output, and wherein the second stage circuit applies the tone reduction filtering to the first stage output to yield a second stage output; and
a polarity change circuit operable to change a polarity of the second stage output to yield a tone reduction output.

17. The storage device of claim 16, wherein the summation circuit is a first summation circuit, and wherein the storage device further comprises:
a second summation circuit operable to subtract the tone reduction output from the equalized output to yield a processing output; and
a data processing circuit operable to apply a processing algorithm to a data input derived from the processing output to recover a data set originally stored to the storage medium.

18. The storage device of claim 16, wherein the summation circuit is a first summation circuit, and wherein the storage device further comprises:
a second summation circuit operable to subtract a summation input derived from the tone reduction output from a first processing output derived from the equalized output to yield a second processing output; and
a data processing circuit operable to apply a processing algorithm to a data input derived from the second processing output to recover a data set originally stored to the storage medium.

19. The storage device of claim 16, wherein the first stage circuit includes:
a difference circuit; and
a filter circuit operable to filter an output of the difference circuit to yield the first stage output.

20. The storage device of claim 19, wherein:
the difference circuit includes:
a delay circuit operable to delay the error output by at least one period to yield a delayed output; and
a summation circuit operable to add the delayed output to the data input; and
the filter circuit includes:
a summation circuit operable to add the output of the difference circuit to a modified value to yield the first stage output;
a first delay circuit operable to delay the first stage output by at least one period to yield a first delayed output;
a second delay circuit operable to delay the first delayed output by at least one period to yield a second delayed output;
a multiplier circuit operable to multiply the first delayed output by a program value to yield a product; and a summation circuit operable to add the product to an input derived from the second delayed output to yield the modified value.

21. A data processing system, the data processing system comprising:
a two stage tone reduction circuit including a first stage circuit and a second stage circuit, wherein the first stage circuit is the same as the second stage circuit, wherein the first stage circuit applies a tone reduction filtering to a data input to yield a first stage output, and wherein the second stage circuit applies the tone reduction filtering to the first stage output to yield a second stage output;
a polarity change circuit operable to change a polarity of the second stage output to yield a tone reduction output; and
wherein the first stage circuit includes:
a difference circuit; and
a filter circuit operable to filter an output of the difference circuit to yield the first stage output.

22. The data processing system of claim 21, wherein the difference circuit comprises:
a delay circuit operable to delay the data input by at least one period to yield a delayed output; and
a summation circuit operable to add the delayed output to the data input.

23. The data processing system of claim 21, wherein the filter circuit comprises:
a summation circuit operable to add the output of the difference circuit to a modified value to yield the first stage output;
a first delay circuit operable to delay the first stage output by at least one period to yield a first delayed output;
a second delay circuit operable to delay the first delayed output by at least one period to yield a second delayed output;
a multiplier circuit operable to multiply the first delayed output by a program value to yield a product; and
a summation circuit operable to add the product to an input derived from the second delayed output to yield the modified value.

24. The data processing system of claim 21, wherein the polarity change circuit is a multiplier circuit operable to multiply the second stage output by a negative one.

* * * * *